United States Patent [19]

Verret et al.

[11] Patent Number: 5,023,690

[45] Date of Patent: Jun. 11, 1991

[54] MERGED BIPOLAR AND COMPLEMENTARY METAL OXIDE SEMICONDUCTOR TRANSISTOR DEVICE

[75] Inventors: Douglas P. Verret, Sugarland, Tex.; Michael C. Smayling, Freising, Fed. Rep. of Germany; Abnash C. Sachdeva, Houston; Stephen A. Keller, Sugarland, both of Tex.

[73] Assignee: Texas Instruments Incorporated, Dallas, Tex.

[21] Appl. No.: 489,762

[22] Filed: Feb. 27, 1990

Related U.S. Application Data

[60] Continuation of Ser. No. 206,062, Jun. 13, 1988, abandoned, which is a division of Ser. No. 922,691, Oct. 24, 1986, Pat. No. 4,719,558.

[51] Int. Cl.$^5$ .............................................. H01L 27/02
[52] U.S. Cl. ......................................... 357/43; 357/34; 357/42; 357/50; 357/49; 357/48
[58] Field of Search .................. 357/34, 43, 42, 44, 357/49, 50, 67 S, 47, 48, 50

[56] References Cited

U.S. PATENT DOCUMENTS

| | | | |
|---|---|---|---|
| 4,184,172 | 1/1980 | Raffel et al. | 357/50 |
| 4,272,776 | 6/1981 | Weijland et al. | 357/50 |
| 4,393,578 | 7/1983 | Cady et al. | 29/576 B |
| 4,403,395 | 9/1983 | Curran | 29/571 |
| 4,408,386 | 10/1983 | Takayashiki et al. | 29/576 E |
| 4,443,933 | 4/1984 | de Brebisson | 437/31 |
| 4,445,268 | 5/1984 | Hirao | 357/43 X |
| 4,484,388 | 11/1984 | Iwasaki | 437/31 |
| 4,486,942 | 12/1984 | Hirao | 357/50 X R |
| 4,495,010 | 1/1985 | Kranzer | 437/31 |
| 4,502,201 | 3/1985 | Muramatsu | 437/54 |
| 4,512,815 | 4/1985 | Khadder et al. | 148/1.5 |
| 4,529,456 | 7/1985 | Anzai et al. | 357/34 X |
| 4,534,824 | 8/1985 | Chen | 156/628 |
| 4,536,945 | 8/1985 | Gray et al. | 29/571 |
| 4,561,932 | 12/1985 | Gris et al. | 156/643 |
| 4,641,417 | 2/1987 | McDavid | 29/571 |
| 4,653,173 | 3/1987 | Chen | 29/571 |

OTHER PUBLICATIONS

Klepner, "Base Oxide Isolation in Recessed Oxide Isolation", *IBM Technical Disclosure Bulletin*, vol. 17, No. 2, Jul. 1974, p. 431.

Primary Examiner—William Mintel
Attorney, Agent, or Firm—B. Peter Barndt; Melvin Sharp; James T. Comfort

[57] ABSTRACT

A method of making a merged bipolar and field effect semiconductor transistors on a semiconductor substrate by forming a diffused buried DUF collector region of a second conductivity type in the substrate, and growing an impurity doped epitaxial layer of silicon of the second conductivity type over the substrate. Once the epitaxial layer is grown, a plurality of isolation regions are formed in this layer. A bipolar transistor is formed over the DUF region in a bipolar isolation region and a field effect transistor formed in the second isolation region. Contacts and interconnects are deposited and patterned.

6 Claims, 8 Drawing Sheets

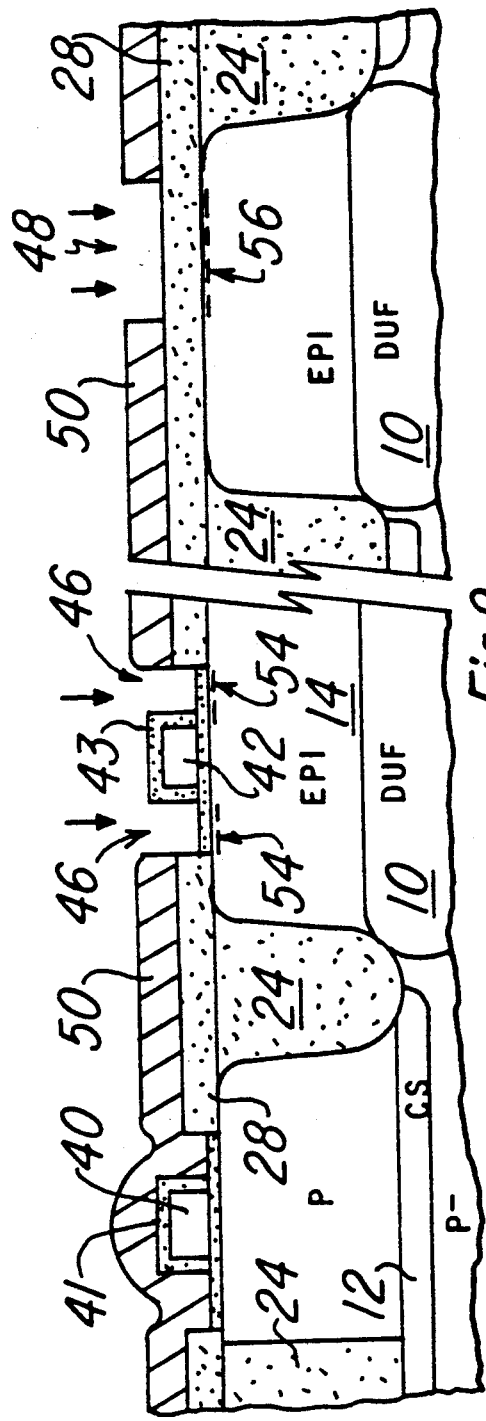
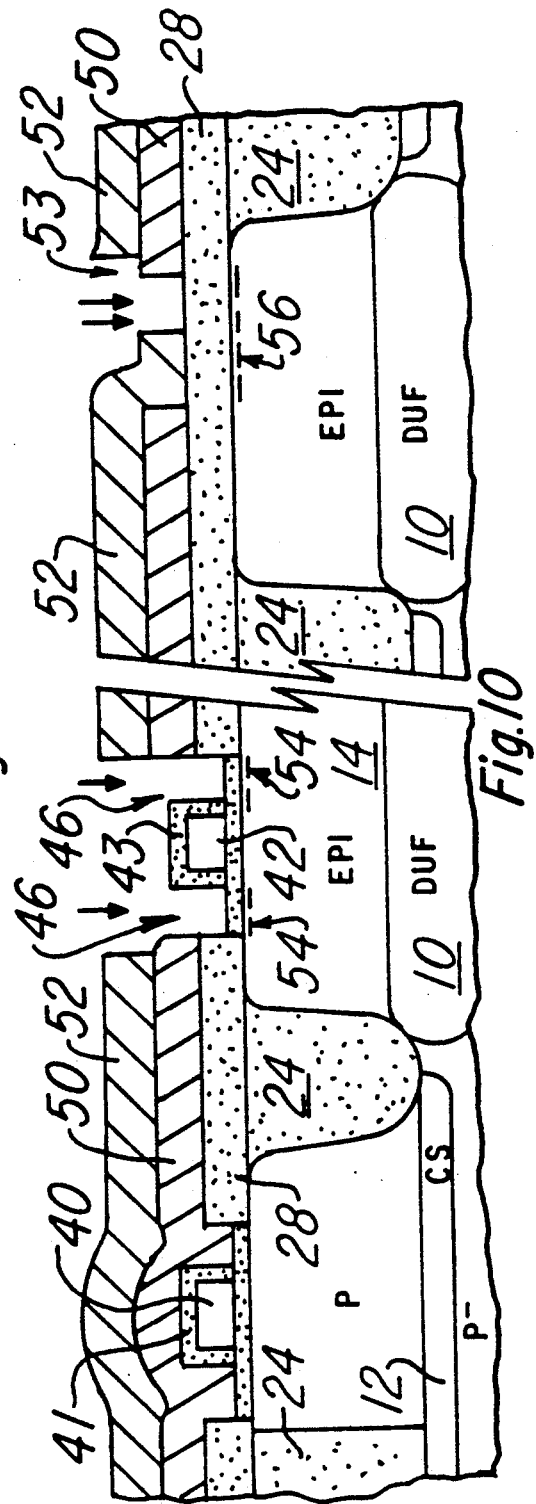

MERGED BIPOLAR AND COMPLEMENTARY METAL OXIDE SEMICONDUCTOR TRANSISTOR DEVICE

This application is a continuation of application Ser. No. 206,062 filed Jun. 13, 1988 now abandoned which is a divisional of application Ser. No. 06/922,961 filed Oct. 24, 1986 now U.S. Pat. No. 4,719,558.

BACKGROUND

The present invention relates to a merged bipolar and metal oxide transistor integrated circuit device including a method of fabrication thereof. The method is applicable to incorporating complementary metal oxide transistors together with a bipolar transistor on a semiconductor substrate in a single merged flow.

Semiconductor manufacturers have wanted to combine bipolar and complementary metal oxide semiconductor (CMOS) transistors in integrated circuits in order to obtain the rapid switching ability and high current drive of the bipolar transistor together with the comparatively low energy consumption of the CMOS transistors. However, the general approach has been to manufacture the merged devices serially in order to avoid compromising diffusion profiles which result in poorer performance. But serial processing is lengthy and proliferates the number of masking steps which in turn reduces yield. Moreover, serial processing is susceptible to the problem of later process steps altering the results of earlier process steps.

The alternative to serial processing is merged or parallel processing in which some or all of the steps required to build one device are used simultaneously to build others thereby reducing the number of masking levels and processing steps. Unfortunately, the process recipes used to date do not always produce optimum performance in all structures simultaneously. In some cases a process recipe that optimizes the performance of some of the devices actually prevents other devices from functioning in any useful manner at all.

A process for merging bipolar and MOS transistors is disclosed in U.S. Pat. No. 4,536,945 issued to Gray et al on Aug. 27, 1985 and assigned to National Semiconductor Corporation. In this case a bipolar transistor and a p-channel transistor are formed in an n-type epitaxial layer while an N-channel transistor is formed on a retrograde p-well. Each transistor is isolated by a thick oxide region extending down to the substrate. The Gray device discloses no means for inhibiting "latch up" of its p-channel transistor caused by leakage current flowing to the substrate.

Gray forms a retrograde p-well before formation of the oxide isolation regions used to separate the transistors. This is done by diffusing together a second impurity deposited on the substrate and a third impurity deposited on the epitaxial layer. The latter step is followed by other anneal in addition to that for forming the oxide isolation regions. These anneal steps cause upward diffusion of the diffused N-type region at the bottom of the bipolar transistor making the thickness of the epitaxial region uncertain and difficult to control. The latter results make it difficult, in turn, to control the transistor breakdown voltage.

A second problem caused by the foregoing anneal steps is the depletion of boron at the surface caused by leaching or depletion of the boron by silicon oxide. This depletion makes the threshold voltage difficult to control.

The use of an indirect moat by Gray et al. and reliance on the oxide isolation regions to establish moat boundaries results in a lower limit to the spacing between transistors which is achievable (typically of the order of 10 microns). Secondly, due to the charge stored on the oxide-silicon interface a relatively significant leakage normally results along this interface.

Third, use of a long high temperature collector diffusion in Gray creates problems in controlling transistor gain and breakdown voltage. Such prolonged high temperature applications cause all of the diffused areas to change and further deplete the surface concentration of Boron and causes upward diffusion of the N-type layer at the substrate surface. In addition, there is no provision for avoiding the formation of polysilicon filaments following etching due to the steep topography created by the 'birdsheads' at the top of the oxide isolation regions. These filaments can cause shorting problems.

It is therefore an object of the invention to provide an improved method of making merged bipolar and MOS devices. In particular it is an object of this invention to provide a method of making an improved merged bipolar and CMOS device.

SUMMARY OF THE INVENTION

According to the invention there is provided a method of making a merged bipolar and metal oxide semiconductor (MOS) transistor on a semiconductor substrate by forming a diffused buried DUF collector region of a second conductivity type in the substrate, and growing an impurity doped epitaxial layer of silicon of the second conductivity type over the substrate. Once the epitaxial layer is grown, a plurality of isolation regions are formed in this layer. A bipolar transistor is formed over the DUF region in a bipolar isolation region and a metal oxide transistor formed in a MOS isolation region.

Implanting and diffusing of the source and drain of the field effect transistor is done concurrently with implanting and diffusing of the bipolar transistor.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1–18 are greatly enlarged elevation views in section of a small portion of a semiconductor chip showing the process steps in fabricating a merged bipolar and CMOS device;

DETAILED DESCRIPTION WITH REFERENCE TO THE DRAWINGS

Figure 1:
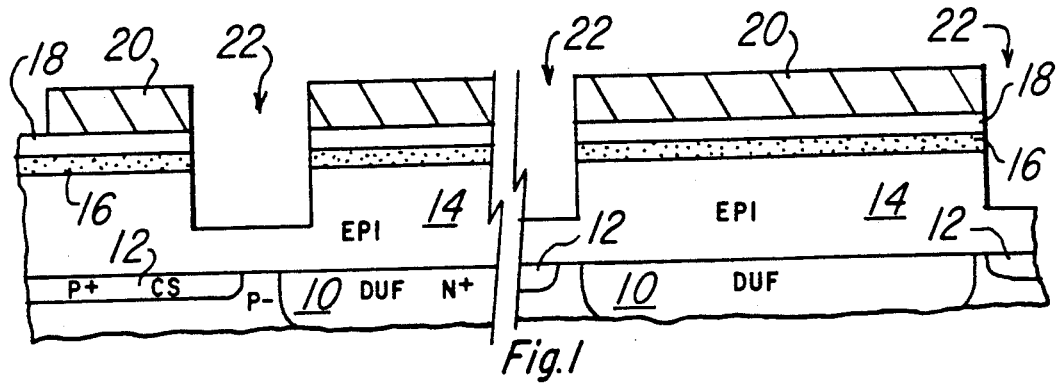

Referring to FIG. 1 there is shown the stage of formation of oxide isolation in an N-type epitaxial layer 14 which has been grown over a pair of N+ buried diffusion under film DUF regions 10 doped with arsenic so as to have a sheet resistance of 15 ohms per square formed in the p-type substrate of a silicon slice (not shown). Also formed in the substrate before growing the N-type epitaxial layer 14 are P+ channel stop regions 12. A thin oxide layer 16 of about 800–1600 Angstroms is grown over the epitaxial layer and then a layer of silicon nitride 18 of about 800–1200 Angstroms thick is formed over the entire slice. A coating of photoresist 20 is applied to the entire top surface of the slice and then exposed to ultra violet light through a mask which defines the desired pattern of spaced apart recessed areas 22. The photoresist is then developed leaving open areas where nitride, oxide and silicon are then removed by etching to form recessed oxide isolation regions 22. The recessed regions are formed over the top end of underlying channel stop regions 12.

Figure 2:
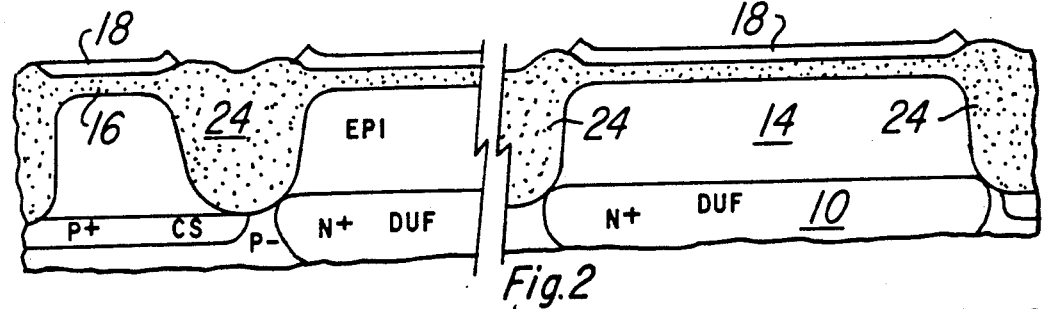
Figure 3:
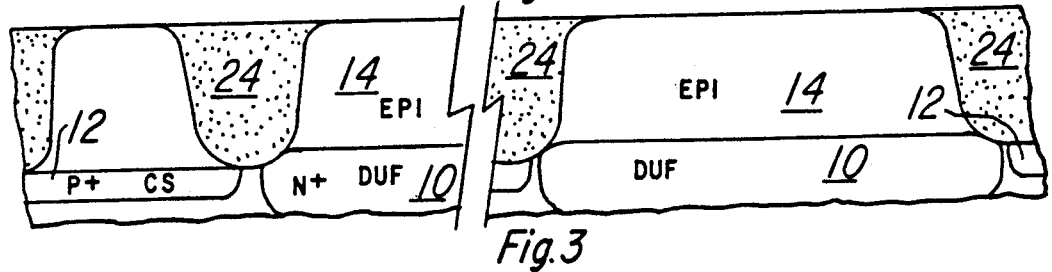

The photoresist 20 is then stripped and the entire slice exposed to an oxidizing high pressure atmosphere at about 900° C. for about 2 hours. During oxidation silicon is consumed so that a relatively thick oxide isolation region is formed part of which is above the bottom of recessed region 22 of FIG. 1 and part below as seen best in FIG. 2. The top surface of the oxide isolation regions 24 develop bumps commonly referred to as 'birdsheads'. The remaining silicon nitride 18 is removed by etching and a layer of photoresist (not shown) with the same etch rate as oxide 24 is applied to the top surface using a "spin on" technique so that the top surface of the photoresist is substantially flat. Next the photoresist is etched back by a reactive ion etch technique until the 'birdsheads' and oxide layer 16 are a flat top surface as seen in FIG. 3.

Figure 4:
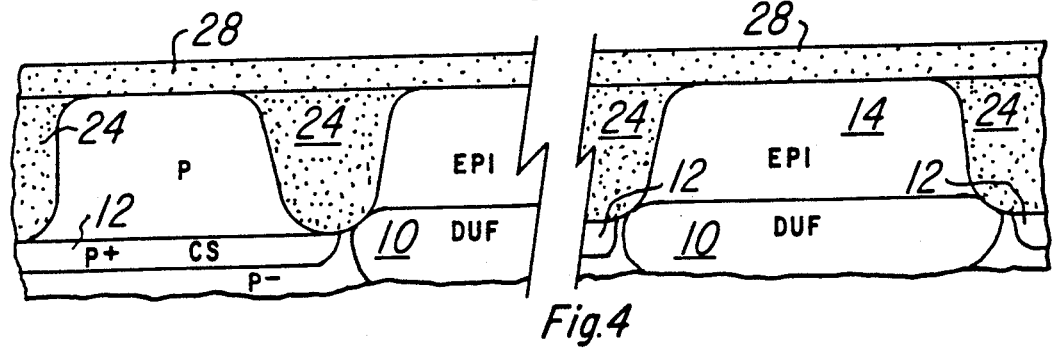

A thermal oxide layer 28 is grown by placing the slice in an oxidizing atmosphere at atmosphere pressure for a sufficient time until a thickness of about 0.25 microns is grown as seen in FIG. 4.

Figure 5:
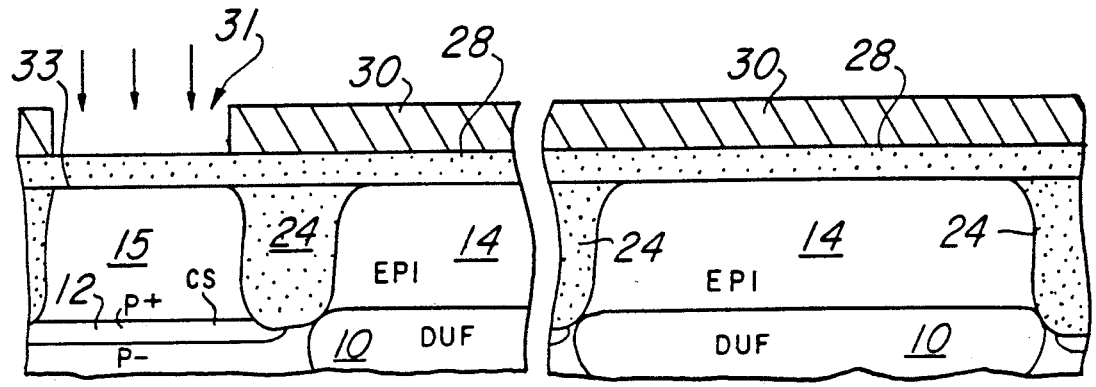

Photoresist 30 is once again deposited over the entire surface of the slice at a thickness sufficient to block a high energy implant and patterned to open region 31 adjacent the oxide isolation region 24 as seen in FIG. 5. Boron or another group III impurity is implanted through the oxide layer 28 with a peak concentration at the epitaxial surface 33 at an energy in the range of 60–110 KeV with a preferred value of 90 KeV and a dose of about $1.0 \times 10^{12}$ atoms per square centimeter. The foregoing shallow boron implant is preceded by an implant having a peak concentration midway from the surface 33 to the channel stop region 12 at over 200. KeV or preferably 240 KeV and a dose of $3-7 \times 10^{12}$ atoms per square centimeter. The thickness of the photoresist 30 is sufficient to block the implantation in regions other than through opening 31. The volume below opening 31 is referred to as a P-well 15.

Figure 6:
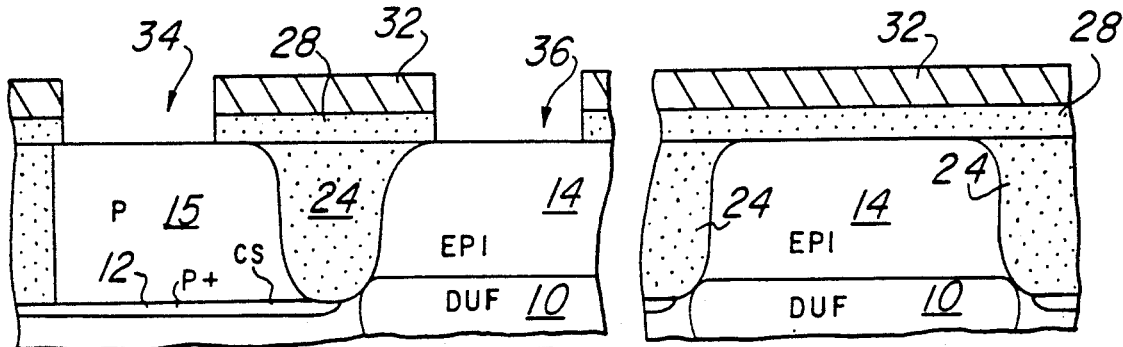
Figure 7:
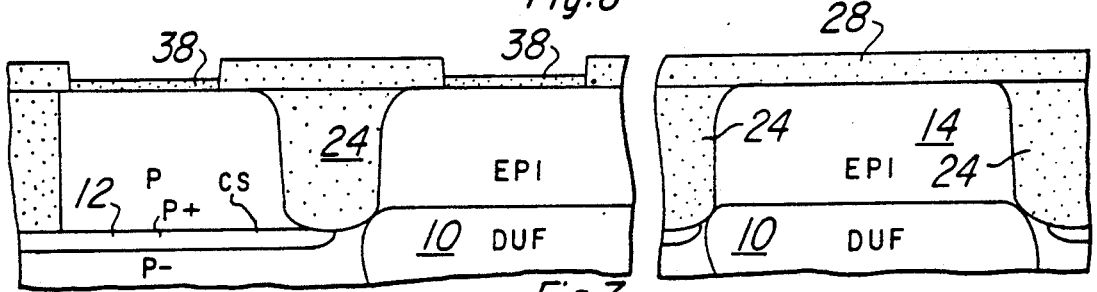
Figure 8:
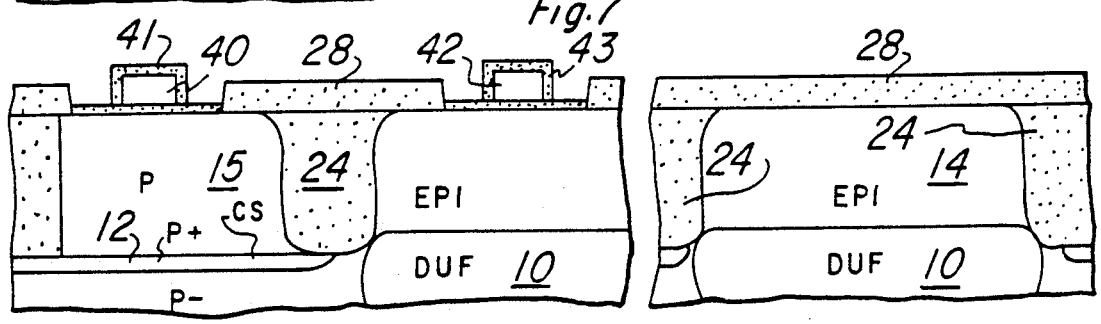

Photoresist layer 30 is stripped and a new photoresist layer 32 is laid down and patterned so as to provide openings 34 and 36 as seen in FIG. 6 where metal oxide semiconductor (MOS) moats are to be formed. Following development of the photoresist 32 portions of oxide 28 within openings 34 and 36 are removed by etching and then gate oxide layers 38 approximately 200–500 Angstroms thick are grown as seen in FIG. 7. A polysilicon layer is then deposited over the slice to a thickness of approximately 6,000 angstroms and doped n-type by means of phosphorus oxychloride (POCl$_3$) in a high temperature furnace. The doped polysilicon is then patterned and etched so as to leave gates 40 and 42. Thermal oxide layers 41 and 43 are grown on the polysilicon gates 40 and 42, respectively, as seen in FIG. 8 to a thickness of about 0.1 to 0.2 microns. Another photoresist layer 50 is deposited and patterned so as to open regions 46 to be source and drain of a P-channel field effect transistor and region 48 to become a base and emitter region of a bipolar transistor as seen in FIG. 9. An implant of boron is done at 90 KeV to a total dose of about $1-7 \times 10^{13}$ atoms per square centimeter through oxide layer 28. A new photoresist layer 52 is laid down and patterned to leave open regions 46 again as well as a smaller opening 53 over a portion of the boron implant 56 as seen in FIG. 10. Another boron implant is done at 70–110 KeV or more preferably 90 KeV to a dose of about $5-9 \times 10^{14}$ atoms per square centimeter. Photoresist layers 50 and 52 are then stripped.

Figure 11:
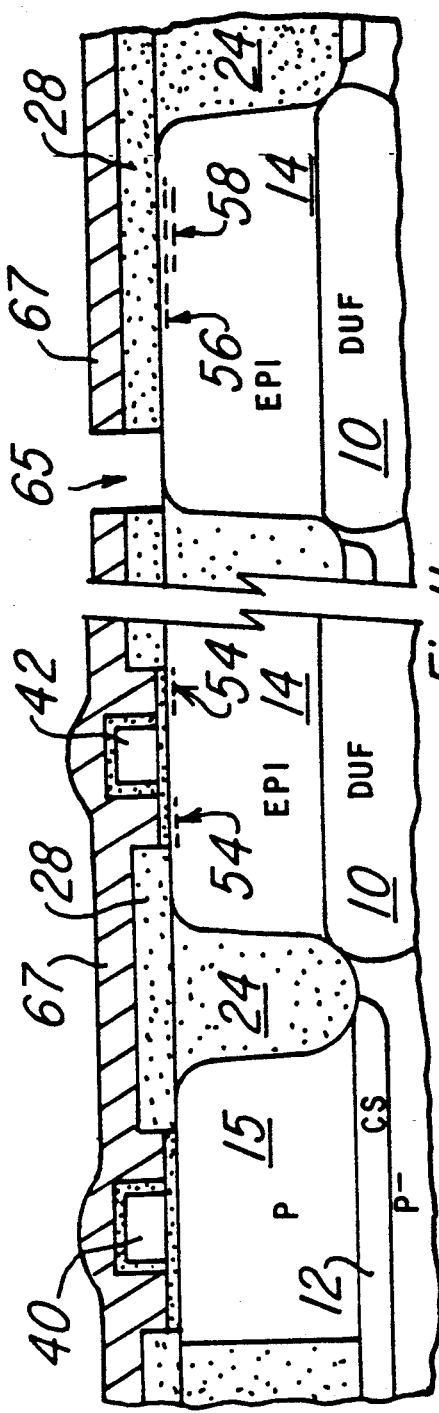
Figure 12:
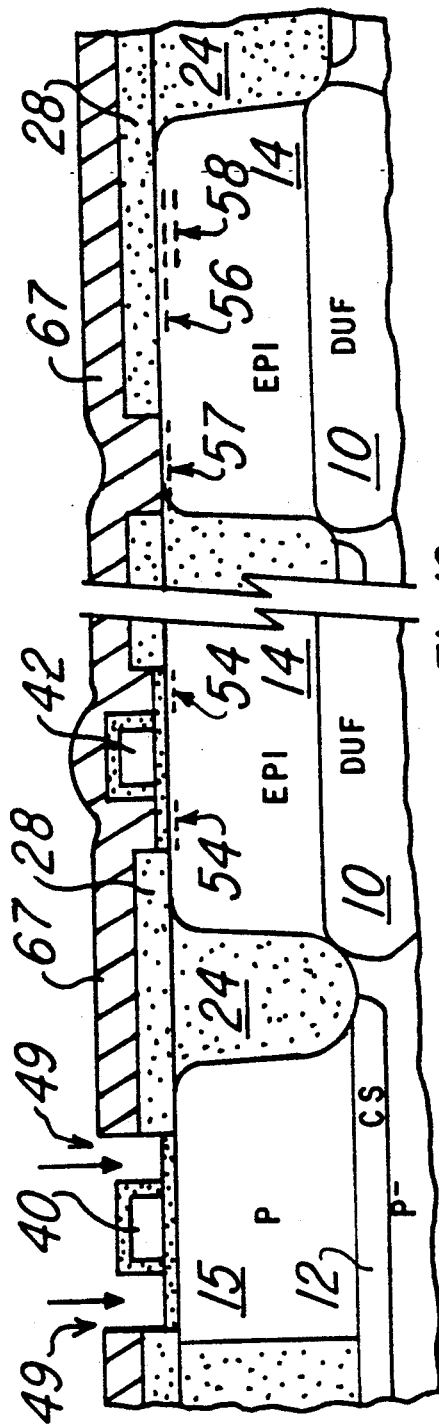
Figure 13:
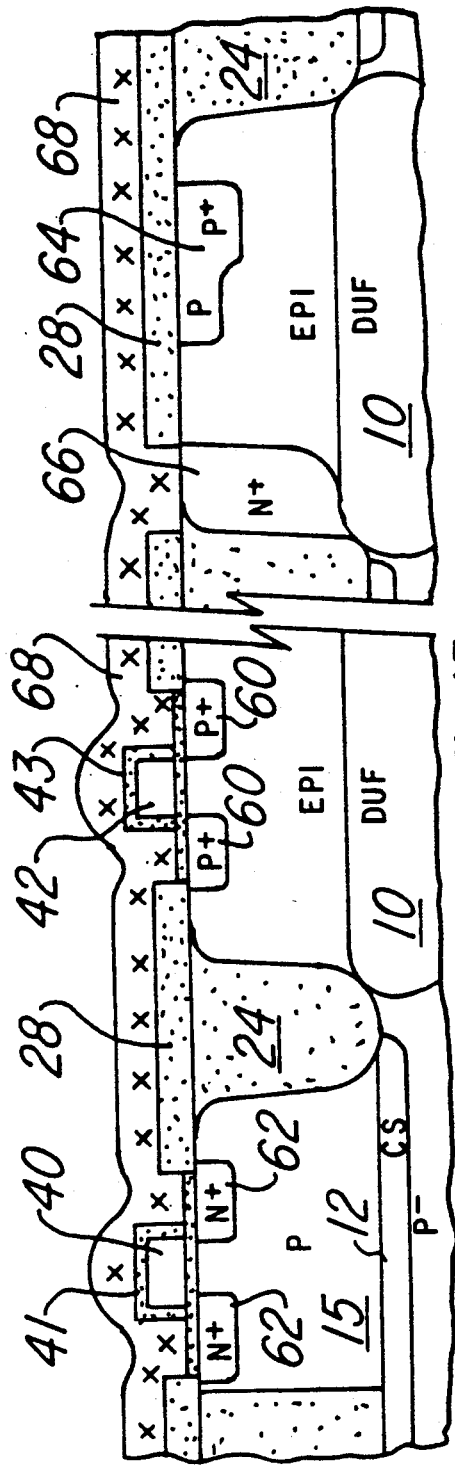

Another photoresist layer 67 is deposited and patterned to open contact hole 65 as seen in FIG. 11. The oxide is removed in the open region 65 and a phosphorous N-type implant is made at 90–150 KeV or more preferably at 100 KeV to a dose of about $2-6 \times 10^{16}$ atoms per square centimeter or, more preferably $2.5 \times 10^{16}$ atoms per square centimeter. Phosphorous, being relatively small in size, penetrates deeply into the epitaxial layer 14 for this implantation energy. Photoresist layer 67 is removed. Next, another photoresist layer 60 is deposited and patterned as shown in FIG. 12 to leave openings 49 for the N-channel MOS transistor source and drain. An arsenic implant is done at 90–150 KeV or more preferably 120 KeV to a dose of about $2-10 \times 10^{15}$ or more preferably $4 \times 10^{15}$ atoms per square centimeter. The photoresist 60 is stripped and a deposition of phosphosilicate glass (PSG) 68 is made followed by a high temperature anneal in an inert atmosphere so as to activate the latter implants as well as implants 54, 56 and 58 and to cause the PSG to flow as seen in FIG. 13. During the anneal step diffused regions 62, 60, 66 and 64 are formed corresponding to the sources and drains of the N-channel and P-channel transistors, the bipolar collector and the bipolar base, respectively. Because of the deepness of the collector implant 66 it diffuses both upwardly and downwardly to both the buried collector or DUF 10 and to the surface of the epitaxial layer 14.

Figure 14:
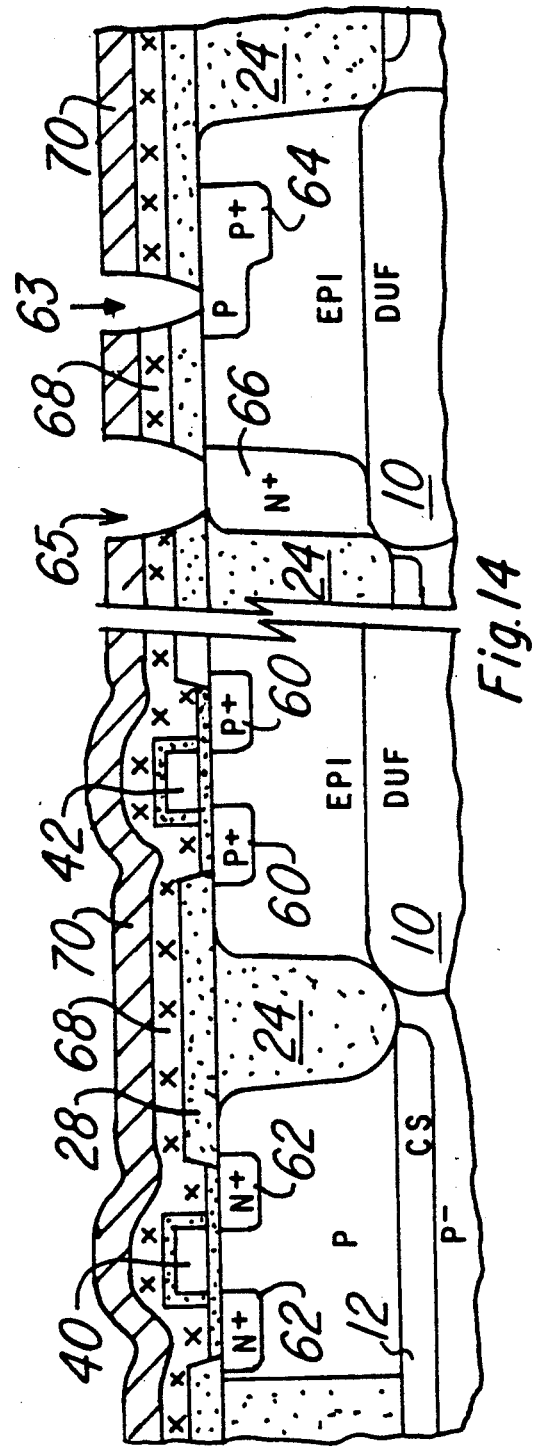
Figure 15:
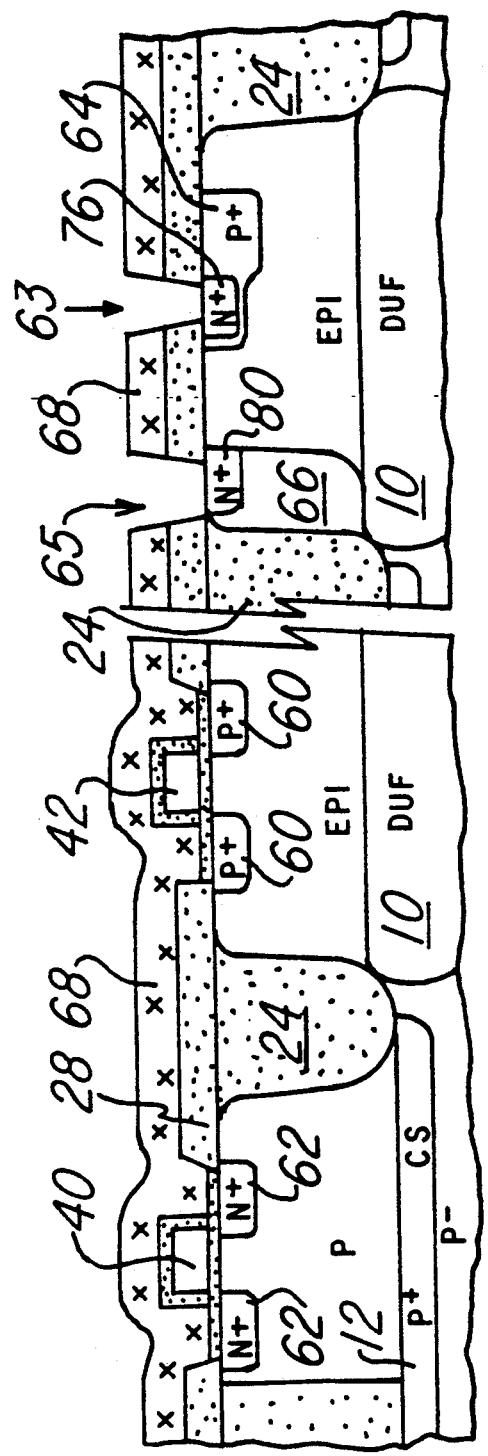

The purpose of the PSG 68 is to passivate the surface of oxide 28 so as to trap any alkali ions on the oxide surface that could otherwise cause leakage. It contains 4–8% by weight of phosphorus. A layer of photoresist 70 is then deposited and patterned to open the bipolar emitter 63 and collector 65 regions as seen in FIG. 14. The PSG is etched in the latter regions so as to expose contact areas on the latter. The layer 70 of photoresist is stripped and an N-type implant of arsenic is made at about 80 KeV and a dose of $4-8 \times 10^{15}$ atoms per square centimeter. A high temperature anneal is done in an inert atmosphere to activate the implant and form by diffusion the N+ type conductivity regions 76 and 80 seen in FIG. 15.

Alternatively, the PSG layer 68 could be deposited after the anneal and diffusion steps and then patterned and etched to open up contact areas to the transistor sources, drains, emitter, base and collector.

Figure 16:
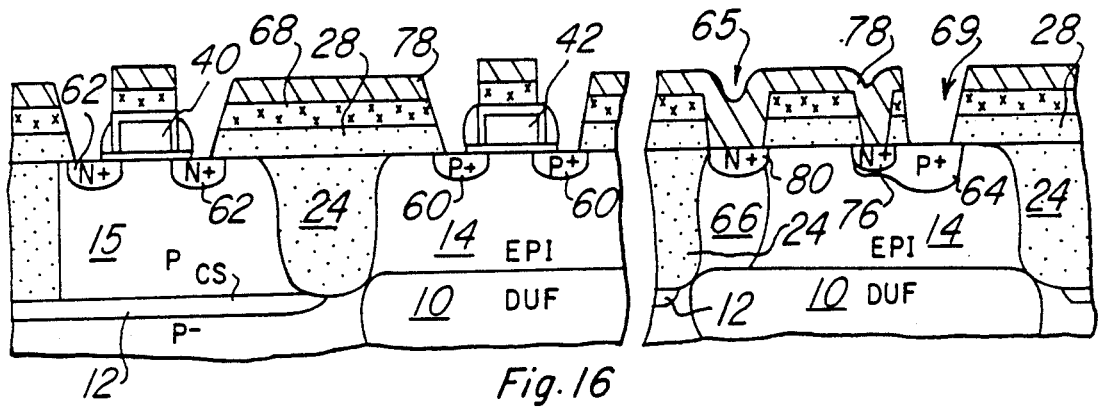
Figure 17:
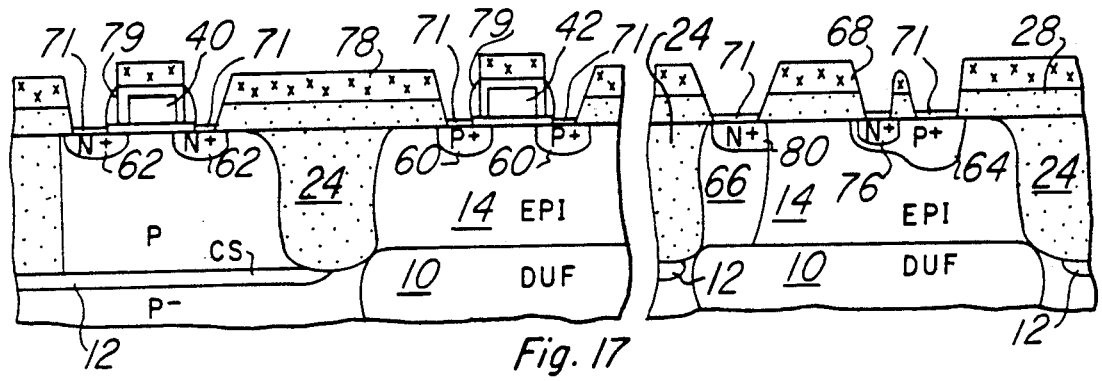
Figure 18:
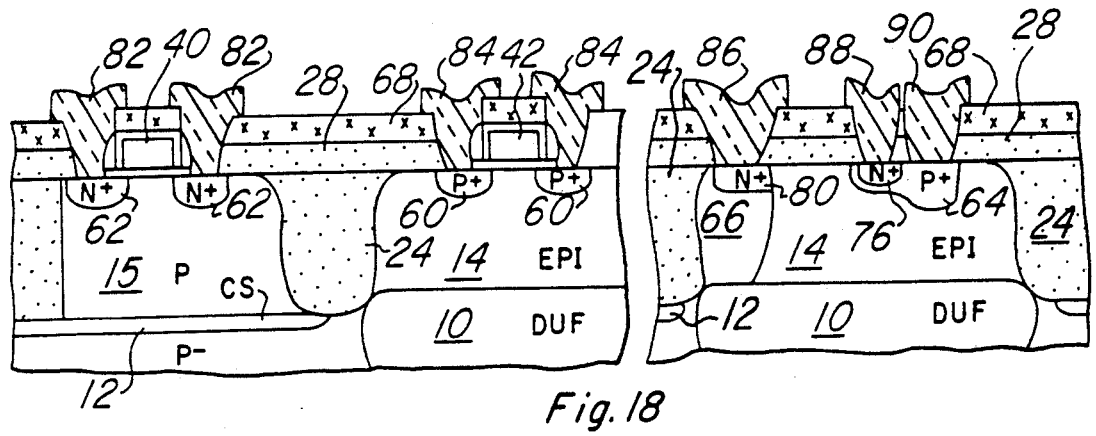

A new layer of photoresist is deposited and patterned to have openings over all of the sources and drains, over base region 69 and over contacts 90 and 92 (see FIG. 19) to polysilicon gates 40 and 42. As seen in FIG. 16 the n contacts of openings 65 and 63 are kept covered while etching the p contact to protect the former. The PSG in the latter regions is etched and the photoresist 78 is stripped leaving all contact areas open. Next platinum is sputtered onto the slice and the slice heated to about 500° C. for about ½ to 1 hour in order to form platinum silicide 71 wherever silicon is in contact with platinum (at the bottom of each contact area). Next platinum on PSG 68 is stripped leaving the structure shown in FIG. 17. Finally, metal for interconnects is deposited, patterned and etched as shown in FIG. 18. Interconnects either in a single or double layer are formed by standard techniques, followed by a passivating overcoat of a 7000 angstrom layer of oxide and a 3000 angstrom layer of silicon nitride.

Figure 19:
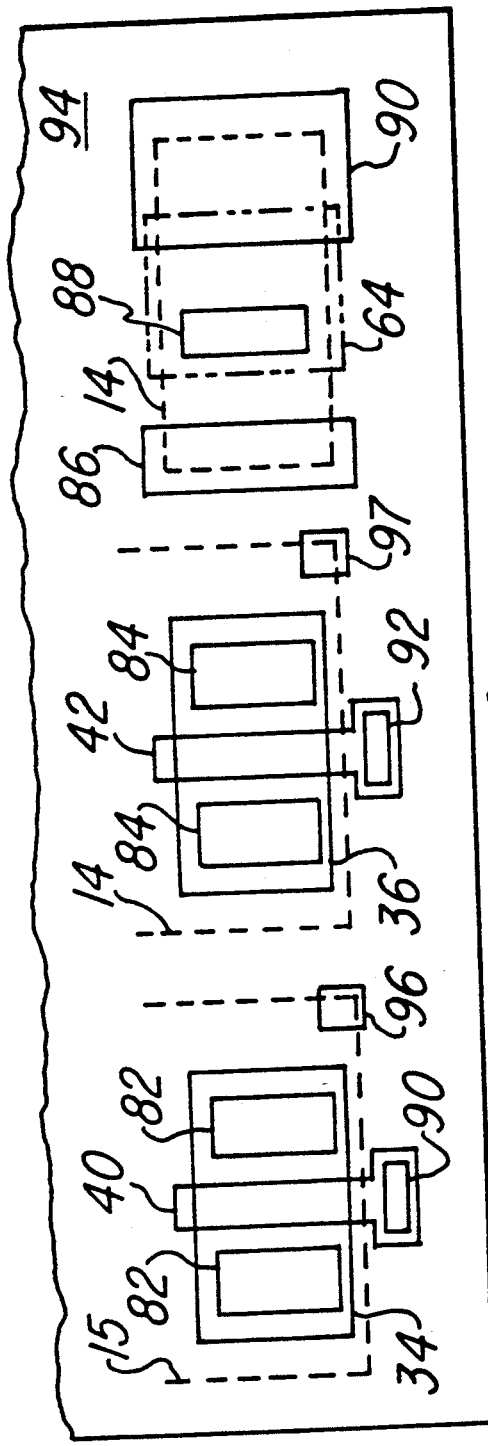
FIG. 19 is a plan view of a merged bipolar CMOS cell as seen in FIG. 18.

A top view of the various regions of the device formed on a slice 94 as shown in FIG. 19 includes moats 34 and 36 of the N-channel and P-channel transistors, respectively. The source/drain contacts 82 and 84 are formed on either side of polysilicon gates 40 and 42, respectively. Each MOS transistor is located within epitaxial regions 15 and 14. The bipolar portion includes collector contact 86, emitter contact 88, base contact 90 shown as covering a portion of the epitaxial region 14 next to base region 64 as to form a Schottky diode. Contacts to the N-type epitaxial layer in the P-channel transistor and to the P well of the N-channel is provided by contacts 97 and 96, respectively.

It will be observed that in the foregoing process definition of the moats is achieved by directly etching the silicon dioxide layer 28 and does not depend therefore on the accuracy of the positioning of oxide isolation regions 24. This procedure allows closer positioning of adjacent N-channel and P-channel transistors which need not be separated from each other by a deep oxide isolation region. A thin surface oxide is all that is necessary in the present case to isolate the latter transistors. This technique avoids problems associated with silicon-field oxide interfaces when an indirect process is used. Use of the channel stop 12 under the P-well and the buried collector or DUF 10 under the P-channel transistor acts to prevent latch-up.

Figure 20:
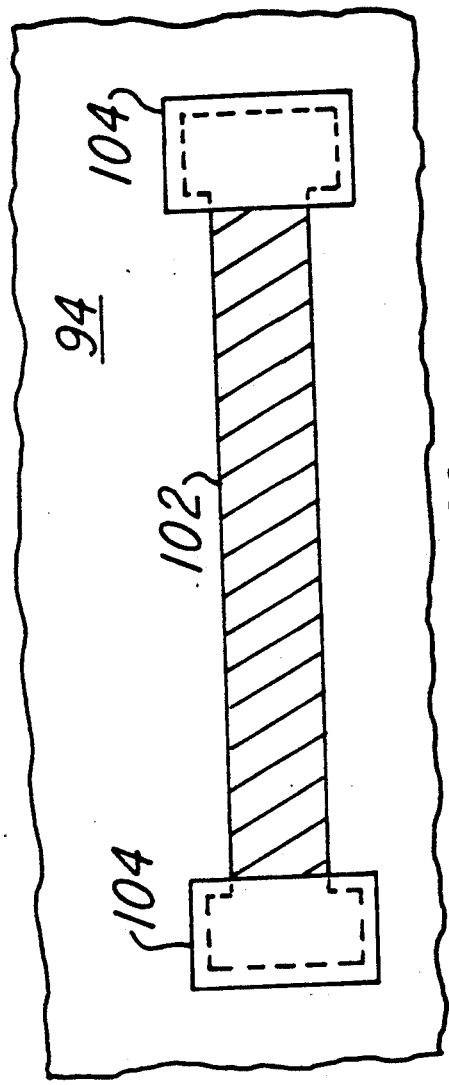
FIG. 20 is a top view showing a resistor.

Formation of resistors on the slice 94 as shown in FIG. 20 involves depositing and patterning photoresist (not shown) over a thin oxide coating covering an epitaxial layer 94 so as to open an area corresponding to resistor body 102. Boron is then implanted through the oxide into the epitaxial layer in areas 102 and 104 to obtain a sheet resistance in the range of 1,000 to 5,000 ohms per square. The photoresist is not stripped and new photoresist (not shown) is deposited and corresponding to the resistor ends and another boron implant is made so as to create P+ regions 104. The photoresist is removed and the thin oxide over areas 104 opened for contacts. Leads are deposited and patterned.

It will be readily appreciated that the Schottky diode shown in FIG. 19 can be formed adjacent the bipolar transistor by simply etching so as to extend contact 90 over the N-epitaxial layer as well as over region 64.

The use of a buried collector under the P-channel transistor avoids problems due to latch-up caused by leakage to the substrate.

By using a high energy implant to form the P-well rather than a long high temperature diffusion, problems associated with controlling gain and breakdown are avoided. In addition avoiding multiple anneal steps minimizes leaching of boron from the surface and therefore allows more accurate establishment of threshold voltage.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An integrated circuit comprising:
   (a) a layer of semiconductor material with a surface;
   (b) a first field effect transistor with channel region in a first N type region in said layer at said surface, said first N type region isolated by a first buried N+ region in said layer away from said surface plus insulator regions extending from the depth of and in contact with said first buried N+ layer to said surface;
   (c) a second field effect transistor with channel region in a first P type region in said layer at said surface, said first P type region isolated by a first buried P+ type region in said layer away from said surface plus insulator regions extending from the depth of and in contact with said first buried P+ layer to said surface;
   (d) a bipolar transistor with collector in a second N type region at said surface, said second N type region isolated by a second buried N+ region in said layer away from said surface plus insulator regions extending from the depth of and in contact with said second buried N+ layer to said surface; and
   (e) conductive interconnections among said transistors.

2. The integrated circuit of claim 1, wherein:
   (a) said insulator regions about corresponding ones of said buried regions.

3. The integrated circuit of claim 1, wherein:
   (a) said field effect transistors are silicon MOSFETs.

4. The integrated circuit of claim 1, wherein:
   (a) said layer is a P type substrate with an N type epilayer at said surface.

5. The integrated circuit of claim 1, further comprising:
   (a) a third N+ region extending from said second buried N+ region to said surface.

6. The integrated circuit of claim 1 wherein
   (a) said insulation regions are planarized at said surface.

* * * * *